United States Patent
Yu

(10) Patent No.: US 10,031,366 B2
(45) Date of Patent: Jul. 24, 2018

(54) COLOR FILTER SUBSTRATE AND LIQUID CRYSTAL DISPLAY PANEL

(71) Applicant: Shenzhen China Star Optoelectronics Technology Co., Ltd., Shenzhen (CN)

(72) Inventor: Xiaoping Yu, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 225 days.

(21) Appl. No.: 14/763,521

(22) PCT Filed: Jun. 23, 2015

(86) PCT No.: PCT/CN2015/082028
§ 371 (c)(1),
(2) Date: Jul. 27, 2015

(87) PCT Pub. No.: WO2016/173106
PCT Pub. Date: Nov. 3, 2016

(65) Prior Publication Data
US 2017/0139266 A1    May 18, 2017

(30) Foreign Application Priority Data

Apr. 28, 2015  (CN) .......................... 2015 1 0208669

(51) Int. Cl.
*G02F 1/1335* (2006.01)
*G02F 1/155* (2006.01)
(Continued)

(52) U.S. Cl.
CPC ....... *G02F 1/133514* (2013.01); *G02B 5/201* (2013.01); *G02B 5/223* (2013.01);
(Continued)

(58) Field of Classification Search
CPC ......... G02F 1/133514; G02F 1/133512; G02F 1/1368; G02F 1/155; G02F 1/157;
(Continued)

(56) References Cited

U.S. PATENT DOCUMENTS

2008/0002110 A1* 1/2008 Choi ................. G02F 1/133514
349/106
2010/0253767 A1* 10/2010 Wang ................. H04N 13/0409
348/51

(Continued)

FOREIGN PATENT DOCUMENTS

CN       102707510 A   * 10/2012
CN       102707510 A     10/2012

*Primary Examiner* — Nathanael R Briggs
(74) *Attorney, Agent, or Firm* — Leong C. Lei

(57) ABSTRACT

The present invention provides a color filter substrate and a liquid crystal display panel. Both comprises a color filter layer (11) having a plurality of red filters, green filters, blue filters (R, G, B) and color change filters (C) aligned in matrix, and a first transparent electrode (41) and a second transparent electrode (42) are respectively positioned at two sides of the color change filter (C), and material of the color change filter (C) is electrochromic material. The color change filter (C) is applied with voltage signals via the first transparent electrode (41) and the second transparent electrode (42) to control color change of the color change filter (C) for conveniently achieving high brightness and high color saturation display; as appearing to be transparent, the transmission is high to satisfy the demand of high brightness display; as the color change filter (C) appears to be a specific color which is not red, green, blue, such as cyan, four colors display can be realized to promote the color expression ability to satisfy the demand of high color saturation display.

16 Claims, 4 Drawing Sheets

(51) Int. Cl.
*G02F 1/157* (2006.01)
*G02B 5/20* (2006.01)
*G02B 5/22* (2006.01)
*G02F 1/1368* (2006.01)
*G02F 1/1362* (2006.01)

(52) U.S. Cl.
CPC ...... *G02F 1/1368* (2013.01); *G02F 1/133512* (2013.01); *G02F 1/155* (2013.01); *G02F 1/157* (2013.01); *G02F 2001/136222* (2013.01); *G02F 2201/44* (2013.01)

(58) Field of Classification Search
CPC ..... G02F 2001/136222; G02F 2201/44; G02B 5/201; G02B 5/223
See application file for complete search history.

(56) References Cited

U.S. PATENT DOCUMENTS

| | | | |
|---|---|---|---|
| 2013/0222748 A1* | 8/2013 | Zhou | G02F 1/167 349/110 |
| 2014/0055837 A1* | 2/2014 | Lee | B60R 1/02 359/267 |
| 2014/0240617 A1* | 8/2014 | Fukutome | G02F 1/13338 349/12 |

* cited by examiner

COLOR FILTER SUBSTRATE AND LIQUID CRYSTAL DISPLAY PANEL

FIELD OF THE INVENTION

The present invention relates to a display technology field, and more particularly to a color filter substrate and a liquid crystal display panel.

BACKGROUND OF THE INVENTION

The LCD (Liquid Crystal Display) possesses advantages of thin body, power saving and no radiation to be widely used in many application scope. It has been widely utilized in, such as mobile phones, PDAs (personal digital assistance), digital cameras, laptop screens or notebook screens.

The present thin film transistor liquid crystal display comprises a shell, a LCD panel located in the shell and a backlight module located in the shell. The structure of the liquid crystal display panel mainly comprises a Thin Film Transistor Array Substrate (TFT Array Substrate), a Color Filter (CF) and a Liquid Crystal Layer arranged between the two substrates. Generally, the thin film transistor array substrate comprises scan lines, data lines, thin film transistors and pixel electrodes; the color filter substrate comprises a black matrix, color filters and a common electrode. The working procedure of the liquid crystal display panel is: the scan drive signal is inputted to the scan line, and the TFT coupled to the scan line is conducted, and the data signal loaded by the data line is applied to the pixel electrode through the TFT. The rotations of the liquid crystal molecules are controlled with the electrical field formed between the pixel electrode and the common electrode. The rotated liquid crystal molecules refract the light of the backlight module and the light passes through the color filters to show color images.

The color filters are the key component of the liquid crystal display to achieve colorization. The function principle is to utilize the light filtering way to generate three primary colors, red (R), green (G), blue (B). Then, the three primary colors are mixed with various ratios to generate respective colors for making the liquid crystal display panel show colors. The performance of the CF substrate (the color purity, the aperture ratio, the chromatism) directly affects the abilities of the color saturation, color contrast ratio, display brightness.

Please refer to FIG. 1, which is a sectional structure diagram of a color filter substrate according to prior art, comprising a substrate 100 and a color filter layer 110 positioned on the substrate 100. The color filter layer 110 comprises red filters R, green filters G, blue filters B aligned in matrix. The red filters R, the green filters G, the blue filters B are manufactured by pigment dispersion. A black matrix 310 separates the respective color filters. At present, it remains facing challenge to satisfy liquid crystal displays of different demands, such as the high brightness liquid crystal display for outdoor display and the high color saturation liquid crystal display. One important reason is that the present color filter substrate cannot satisfy the demands of the high brightness and the high color saturation at the same time. Although there already has a method of adding white (W) matrix to obtain the RGBW display matrix for acquiring the high brightness liquid crystal display device, the color saturation will be weakened as increasing the brightness. The demands of the high brightness and the high color saturation cannot be satisfied at the same time.

The electrochromism means the phenomenon that the absorption wavelength if the material generates the reversible change with the function of the external electric field, which actually is an electrochemistry oxidation-reduction reaction. The material shows the reversible change of the color in appearance after reaction. The electrochromic material can appear to be transparent without any colors in condition of no electric field. Then, as the electric field is applied through the external source, the electrochromic material can show a specific color; or it can show the specific color in condition of no electric field, and as the electric field is applied, the electrochromic material appears to be transparent without any colors. Meanwhile, the electrochromic material has memory function. When the external electric field disappears, the color can remain unchanged. The electrochromic device utilizing the electrochromic phenomenon has kinds of advantages, such as having the high reflectivity but without external light source, and possessing the merits of high contrast ratio, low driving voltage and rich colors. It provides excellent flexibility and portability, and reduces weight. Therefore, the electrochromic material possesses a certain potential to be applied in the display device field and draws tons of attention.

SUMMARY OF THE INVENTION

An objective of the present invention is to provide a color filter substrate, capable of controlling the color change of the filters and possessing high brightness and high color saturation.

Another objective of the present invention is to provide a liquid crystal display panel, conveniently achieving an easy switch of a high brightness display mode and a high color saturation mode and meanwhile, satisfying demands of high brightness and high color saturation display.

For realizing the aforesaid objective, the present invention provides a color filter substrate, comprises a substrate, a color filter layer positioned on the substrate and a protective layer positioned on the color filter layer;

the color filter layer comprises a plurality of red filters, green filters, blue filters and color change filters aligned in matrix, and a first transparent electrode and a second transparent electrode are respectively positioned at two sides of the color change filter; a black matrix separates the plurality of red filters, the green filters, the blue filters and the color change filters aligned in matrix;

material of the color change filter is electrochromic material, and the color change filter is applied with voltage signals via the first transparent electrode and the second transparent electrode to control color change of the color change filter.

Before the color change filter is applied with the voltage signals via the first transparent electrode and the second transparent electrode, the color change filter appears to be transparent; after the color change filter is applied with the voltage signals via the first transparent electrode and the second transparent electrode, the color change filter appears to be a specific color which is not red, green, blue;

or before the color change filter is applied with the voltage signals via the first transparent electrode and the second transparent electrode, the color change filter appears to be a specific color which is not red, green, blue; after the color change filter is applied with the voltage signals via the first transparent electrode and the second transparent electrode, the color change filter appears to be transparent.

The chromaticity coordinates of the specific color comprises x(0.01~0.265), y(0.01~0.710).

The specific color is cyan.

The electrochromic material comprises one or more of n-type metal oxide, compound based on viologen group, compound based on phthalate, compound based on pyridine, compound based on anthraquinone and cathode decolorized conductive polymer; and further comprises one or more of p-type metal oxide, compound based on aniline, compound based on amino quinones, organic compound based on rare earth elements, compound based on dibenzo-p-dioxins, compound based on dye and anode decolorized conductive polymer.

The red filters, the green filters and the blue filters are manufactured by pigment dispersion, dye or ink injection.

The first transparent electrode, the color change filter and the second transparent electrode are sequentially stacked on the substrate.

The present invention further provides a color filter substrate, comprises a substrate, a color filter layer positioned on the substrate and a protective layer positioned on the color filter layer;

the color filter layer comprises a plurality of red filters, green filters, blue filters and color change filters aligned in matrix, and a first transparent electrode and a second transparent electrode are respectively positioned at two sides of the color change filter; a black matrix separates the plurality of red filters, the green filters, the blue filters and the color change filters aligned in matrix;

material of the color change filter is electrochromic material, and the color change filter is applied with voltage signals via the first transparent electrode and the second transparent electrode to control color change of the color change filter;

wherein the electrochromic material comprises one or more of n-type metal oxide, compound based on viologen group, compound based on phthalate, compound based on pyridine, compound based on anthraquinone and cathode decolorized conductive polymer; and further comprises one or more of p-type metal oxide, compound based on aniline, compound based on amino quinones, organic compound based on rare earth elements, compound based on dibenzo-p-dioxins, compound based on dye and anode decolorized conductive polymer;

wherein the red filters, the green filters and the blue filters are manufactured by pigment dispersion, dye or ink injection.

The present invention further provides a liquid crystal display panel, comprising an opposite substrate and an array substrate which are oppositely positioned, and a liquid crystal layer filled between the opposite substrate and the array substrate;

the opposite substrate or the array substrate further comprises a color filter layer and a protective layer positioned on the color filter layer; the color filter layer comprises a plurality of red filters, green filters, blue filters and color change filters aligned in matrix, and a first transparent electrode and a second transparent electrode are respectively positioned at two sides of the color change filter; a black matrix separates the plurality of red filters, the green filters, the blue filters and the color change filters aligned in matrix;

material of the color change filter is electrochromic material, and the color change filter is applied with voltage signals via the first transparent electrode and the second transparent electrode to control color change of the color change filter for make the liquid crystal display panel conveniently achieve an easy switch of a high brightness display mode and a high color saturation mode.

Before the color change filter is applied with the voltage signals via the first transparent electrode and the second transparent electrode, the color change filter appears to be transparent; after the color change filter is applied with the voltage signals via the first transparent electrode and the second transparent electrode, the color change filter appears to be a specific color which is not red, green, blue;

or before the color change filter is applied with the voltage signals via the first transparent electrode and the second transparent electrode, the color change filter appears to be a specific color which is not red, green, blue; after the color change filter is applied with the voltage signals via the first transparent electrode and the second transparent electrode, the color change filter appears to be transparent.

The chromaticity coordinates of the specific color comprises x(0.01~0.265), y(0.01~0.710).

The specific color is cyan.

The electrochromic material comprises one or more of n-type metal oxide, compound based on viologen group, compound based on phthalate, compound based on pyridine, compound based on anthraquinone and cathode decolorized conductive polymer; and further comprises one or more of p-type metal oxide, compound based on aniline, compound based on amino quinones, organic compound based on rare earth elements, compound based on dibenzo-p-dioxins, compound based on dye and anode decolorized conductive polymer;

the red filters, the green filters and the blue filters are manufactured by pigment dispersion, dye or ink injection.

The color filter layer is positioned on the opposite substrate, and the first transparent electrode, the color change filter and the second transparent electrode are sequentially stacked on the opposite substrate; the array substrate further comprises a plurality of thin film transistors aligned in matrix and pixel electrodes electrically coupled to the thin film transistors.

The color filter layer is positioned on the array substrate, and the array substrate further comprises a plurality of thin film transistors aligned in matrix and pixel electrodes electrically coupled to the thin film transistors; the first transparent electrode, the color change filter and the second transparent electrode are sequentially stacked; a common electrode is positioned on the opposite substrate.

The benefits of the present invention are: the present invention provides a color filter substrate and a liquid crystal display panel. Both comprises a color filter layer having a plurality of red filters, green filters, blue filters and color change filters aligned in matrix, and a first transparent electrode and a second transparent electrode are respectively positioned at two sides of the color change filter, and material of the color change filter is electrochromic material. The color change filter is applied with voltage signals via the first transparent electrode and the second transparent electrode to control color change of the color change filter for conveniently achieving high brightness and high color saturation display; as appearing to be transparent, the transmission is high to satisfy the demand of high brightness display; as the color change filter appears to be a specific color which is not red, green, blue, such as cyan, four colors display can be realized to promote the color expression ability to satisfy the demand of high color saturation display. By controlling the applied voltages of the two ends of the color change filter, it is capable of conveniently achieving an easy switch of a high brightness display mode and a high color saturation mode and meanwhile, satisfying demands of high brightness and high color saturation display.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
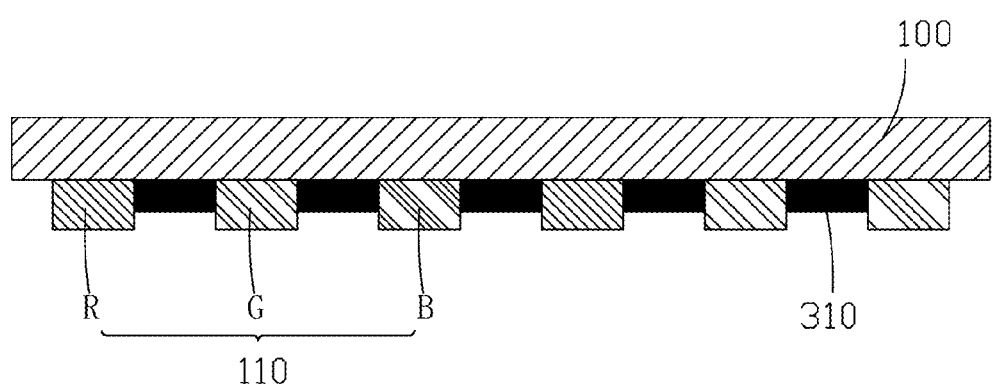
FIG. 1 is a sectional structure diagram of a color filter substrate according to prior art.
Figure 2:
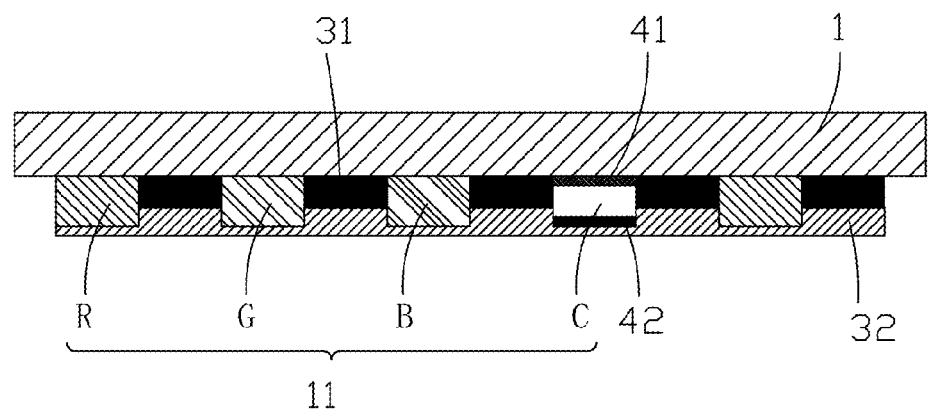
FIG. 2 is a sectional structure diagram of a color filter of the present invention before the color change filter is applied with voltage signals.
Figure 3:
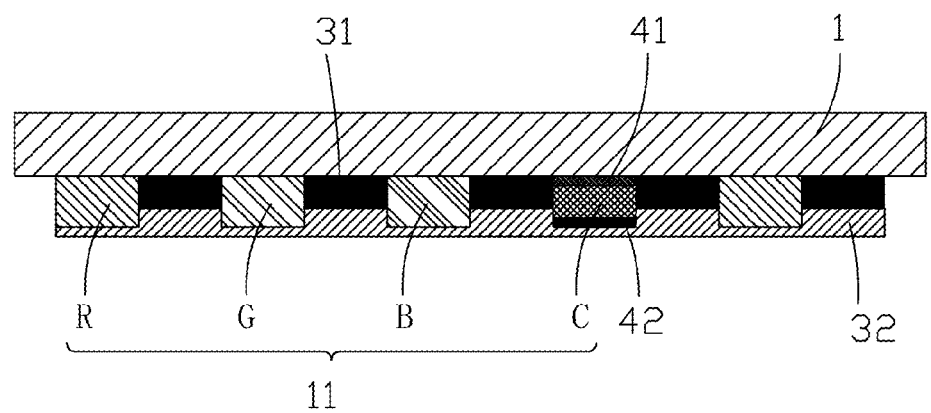
FIG. 3 is a sectional structure diagram of a color filter of the present invention after the color change filter is applied with voltage signals.

Please refer to FIG. 2, FIG. 3. The present invention first provides a color filter substrate, comprising a substrate 1, a color filter layer 11 positioned on the substrate 1 and a protective layer 32 positioned on the color filter layer 11.

The color filter layer 11 comprises a plurality of red filters R, green filters G, blue filters B and color change filters C aligned in matrix, and a first transparent electrode 41 and a second transparent electrode 42 are respectively positioned at two sides of the color change filter C; a black matrix 31 separates the plurality of red filters R, the green filters G, the blue filters B and the color change filters C aligned in matrix.

Figure 4:
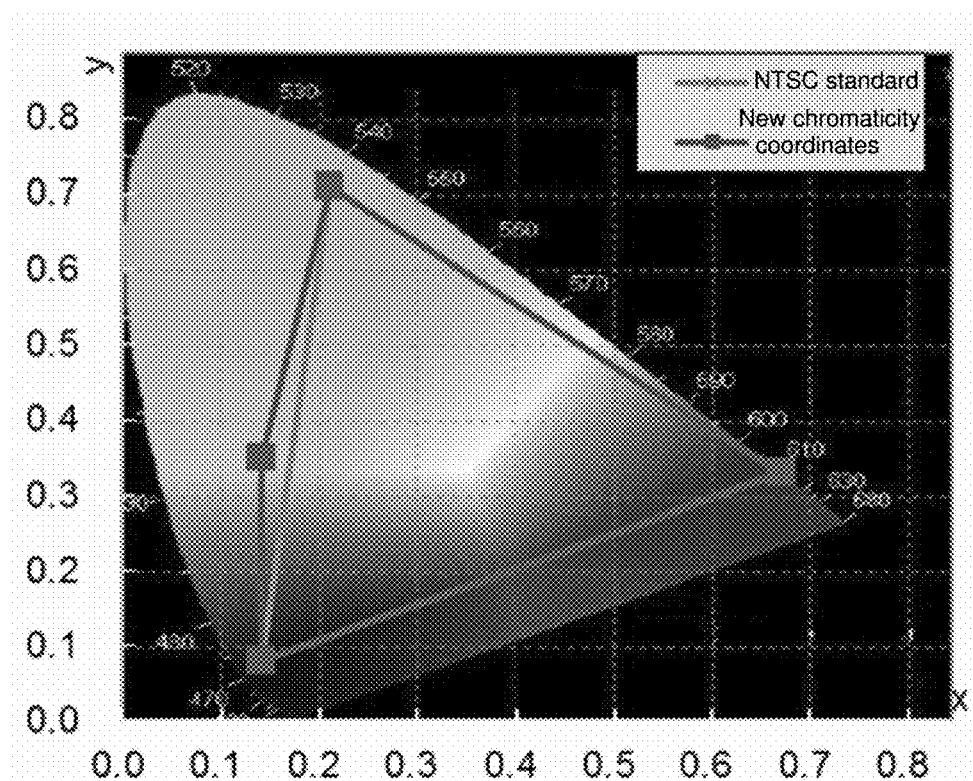
FIG. 4 is a CIE1931xy chromatic diagram of a color filter substrate according to the present invention.

Material of the color change filter C is electrochromic material, and the color change filter C is applied with voltage signals via the first transparent electrode 41 and the second transparent electrode 42 to control color change of the color change filter C. As shown in FIG. 2, the first transparent electrode 41 and the second transparent electrode 42 are not electrified, i.e. before the color change filter C is applied with the voltage signals via the first transparent electrode 41 and the second transparent electrode 42, the color change filter has not color and appears to be transparent, and the transmission of the light is high. As the color filter substrate is applied to the liquid crystal display panel, the high brightness display mode can be realized to satisfy the demand of outdoor display. As shown in FIG. 3, the first transparent electrode 41 and the second transparent electrode 42 are electrified, i.e. after the color change filter C is applied with the voltage signals via the first transparent electrode 41 and the second transparent electrode 42, the color change filter C appears to be a specific color which is not red, green, blue, such as cyan. As the color filter substrate is applied to the liquid crystal display panel, four colors display can be realized, such as red, green, blue, cyan four colors display, the high color saturation display mode can be achieved. As shown in FIG. 4, the color filter substrate utilizing the present invention expands the range of the image display colors and promotes the color saturation of the image display and the color expression ability to satisfy the demand of high color saturation display.

Certainly, according to the property of the electrochromic material, the color change filter C can appear to be transparent in condition that the voltage signals are applied to show no colors, and appear to be to be a specific color which is not red, green, blue in condition that the voltage signals are not applied.

Preferably, the chromaticity coordinates of the specific color comprises x(0.01~0.265), y(0.01~0.710). Furthermore, the specific color is cyan.

Specifically, the electrochromic material comprises one or more of n-type metal oxide, compound based on viologen group, compound based on phthalate, compound based on pyridine, compound based on anthraquinone and cathode decolorized conductive polymer; and further comprises one or more of p-type metal oxide, compound based on aniline, compound based on amino quinones, organic compound based on rare earth elements, compound based on dibenzo-p-dioxins, compound based on dye and anode decolorized conductive polymer.

The red filters, the green filters and the blue filters can be manufactured by utilizing the present pigment dispersion, dye or ink injection. The color change filter C can be manufactured with selecting the proper method according to the properties of the utilized electrochromic material.

Significantly, in the color filter substrate, the first transparent electrode 41, the color change filter C and the second transparent electrode 42 are sequentially stacked on the substrate 1. A protective layer 32 is positioned on the color filter layer 11 to prevent the interference of the first transparent electrode 41 and the second transparent electrode 42 to the pixel electrodes and the common electrode as the color filter substrate is applied to the liquid crystal display.

Figure 5:
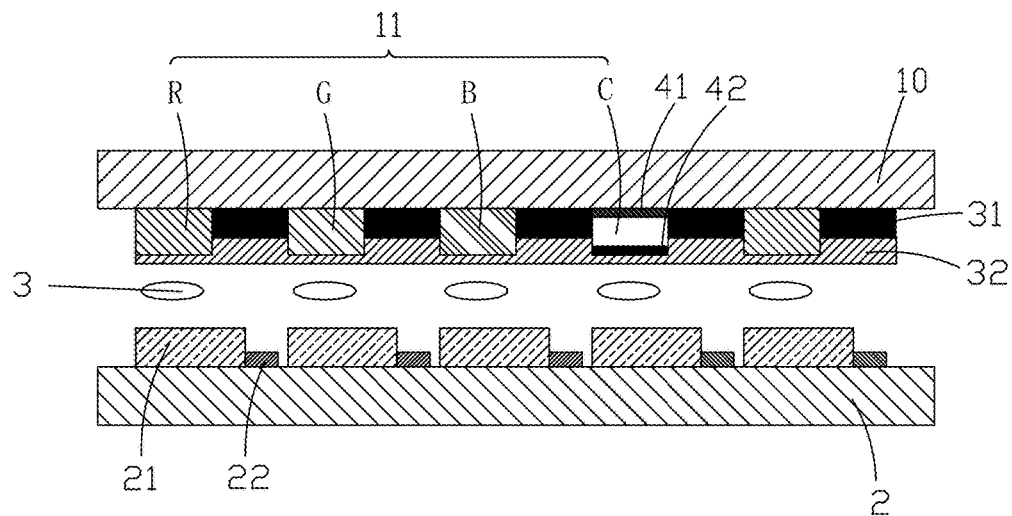
FIG. 5 is a sectional structure diagram of a first embodiment according to the liquid crystal display panel of the present invention.

On the basis of the same inventive idea, the present invention further provides a liquid crystal display panel. FIG. 5 shows a first embodiment according to the liquid crystal display panel of the present invention, comprising an opposite substrate 10 and an array substrate 2 which are oppositely positioned, and a liquid crystal layer 3 filled between the opposite substrate 10 and the array substrate 2. The opposite substrate 10 comprises a color filter layer 11 and a protective layer 32 positioned on the color filter layer 11. The color filter layer 11 comprises a plurality of red filters R, green filters G, blue filters B and color change filters C aligned in matrix, and a first transparent electrode 41 and a second transparent electrode 42 are respectively positioned at two sides of the color change filter C; a black matrix 31 separates the plurality of red filters R, the green filters G, the blue filters B and the color change filters C aligned in matrix.

Furthermore, the first transparent electrode 41, the color change filter C and the second transparent electrode 42 are sequentially stacked on the opposite substrate 10. The array substrate 2 further comprises a plurality of thin film transistors 22 aligned in matrix and pixel electrodes 21 electrically coupled to the thin film transistors 22.

Material of the color change filter C is electrochromic material, and the color change filter C is applied with voltage signals via the first transparent electrode 41 and the second transparent electrode 42 to control color change of the color change filter C. As the first transparent electrode 41 and the second transparent electrode 42 are not electrified, i.e. before the color change filter C is applied with the voltage signals via the first transparent electrode 41 and the second transparent electrode 42, the color change filter has not color and appears to be transparent, and the transmission of the light is high. As the color filter substrate is applied to the liquid crystal display panel, the high brightness display mode can be realized to satisfy the demand of outdoor display; as the first transparent electrode 41 and the second transparent electrode 42 are electrified, i.e. after the color change filter C is applied with the voltage signals via the first transparent electrode 41 and the second transparent electrode 42, the color change filter C appears to be a specific color which is not red, green, blue, such as cyan. As the color filter substrate is applied to the liquid crystal display panel, four colors display can be realized, such as red, green, blue, cyan four colors display, the high color saturation display mode can be achieved to promote the color saturation of the image display and the color expression ability to satisfy the demand of high color saturation display; by controlling the applied voltages of the two ends of the color change filter C, it is capable of conveniently achieving an easy switch of a high brightness display mode and a high color saturation mode and meanwhile, satisfying demands of high brightness and high color saturation display.

Certainly, according to the property of the electrochromic material, the color change filter C can appear to be transparent in condition that the voltage signals are applied to show no colors, and appear to be to be a specific color which is not red, green, blue in condition that the voltage signals are not applied.

Preferably, the chromaticity coordinates of the specific color comprises x(0.01~0.265), y(0.01~0.710). Furthermore, the specific color is cyan.

Specifically, the electrochromic material comprises one or more of n-type metal oxide, compound based on viologen group, compound based on phthalate, compound based on pyridine, compound based on anthraquinone and cathode decolorized conductive polymer; and further comprises one or more of p-type metal oxide, compound based on aniline, compound based on amino quinones, organic compound based on rare earth elements, compound based on dibenzo-p-dioxins, compound based on dye and anode decolorized conductive polymer.

The red filters, the green filters and the blue filters can be manufactured by utilizing the present pigment dispersion, dye or ink injection. The color change filter C can be manufactured with selecting the proper method according to the properties of the utilized electrochromic material.

Significantly, the first transparent electrode 41, the color change filter C and the second transparent electrode 42 are sequentially stacked on the opposite substrate 10, and a protective layer 32 is positioned on the color filter layer 11 to prevent the interference of the first transparent electrode 41 and the second transparent electrode 42 to the pixel electrodes 21 and the common electrode as the color filter substrate is applied to the liquid crystal display.

Figure 6:
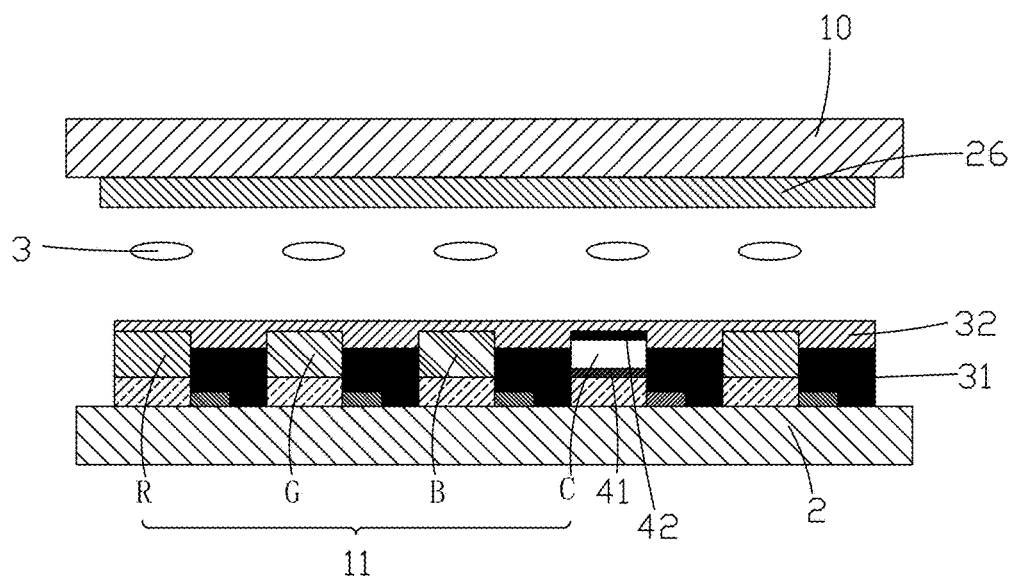
FIG. 6 is a sectional structure diagram of a second embodiment according to the liquid crystal display panel of the present invention.

What FIG. 6 shows is a second embodiment according to the liquid crystal display panel of the present invention. The difference from the first embodiment is: the color filter layer 11 is positioned on the array substrate 2, and the array substrate 2 further comprises a plurality of thin film transistors 22 aligned in matrix and pixel electrodes 21 electrically coupled to the thin film transistors 22; the first transparent electrode 41, the color change filter C and the second transparent electrode 42 are sequentially stacked. A common electrode 26 is positioned on the opposite substrate 10. The reset is the same as the first embodiment. The repeated description is omitted here.

In conclusion, both the color filter substrate and the liquid crystal display panel of the present invention comprises a color filter layer having a plurality of red filters, green filters, blue filters and color change filters aligned in matrix, and a first transparent electrode and a second transparent electrode are respectively positioned at two sides of the color change filter, and material of the color change filter is electrochromic material. The color change filter is applied with voltage signals via the first transparent electrode and the second transparent electrode to control color change of the color change filter for conveniently achieving high brightness and high color saturation display; as appearing to be transparent, the transmission is high to satisfy the demand of high brightness display; as the color change filter appears to be a specific color which is not red, green, blue, such as cyan, four colors display can be realized to promote the color expression ability to satisfy the demand of high color saturation display. By controlling the applied voltages of the two ends of the color change filter, it is capable of conveniently achieving an easy switch of a high brightness display mode and a high color saturation mode and meanwhile, satisfying demands of high brightness and high color saturation display.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A color filter substrate, comprises a substrate, a color filter layer positioned on the substrate and a protective layer positioned on the color filter layer;

the color filter layer comprises a plurality of red filters, green filters, blue filters and color change filters aligned in matrix and aligned in a same plane, and a first transparent electrode and a second transparent electrode are respectively positioned at two sides of the color change filter; a black matrix separates the plurality of red filters, the green filters, the blue filters and the color change filters aligned in matrix and aligned in the same plane;

material of the color change filter is electrochromic material, and the color change filter is applied with voltage signals via the first transparent electrode and the second transparent electrode to control color change of the color change filter;

wherein before the color change filter is applied with the voltage signals via the first transparent electrode and the second transparent electrode, the color change filter appears to be transparent to achieve high brightness; after the color change filter is applied with the voltage signals via the first transparent electrode and the second transparent electrode, the color change filter appears to be a specific color which is not red, green, blue and black to promote color expression ability for achieving high color saturation;

or before the color change filter is applied with the voltage signals via the first transparent electrode and the second transparent electrode, the color change filter appears to be a specific color which is not red, green, blue and black to promote color expression ability for achieving high color saturation; after the color change filter is applied with the voltage signals via the first transparent electrode and the second transparent electrode, the color change filter appears to be transparent to achieve high brightness;

wherein the protective layer positioned on the color filter layer prevents an interference of the first transparent electrode and the second transparent electrode to pixel electrodes and a common electrode of a liquid crystal display panel as the color filter layer is applied to the liquid crystal display panel.

2. The color filter substrate according to claim 1, wherein the chromaticity coordinates of the specific color comprises x(0.01~0.265), y(0.01~0.710).

3. The color filter substrate according to claim 2, wherein the specific color is cyan.

4. The color filter substrate according to claim 1, wherein the electrochromic material comprises one or more of n-type metal oxide, compound based on viologen group, compound based on phthalate, compound based on pyridine, compound based on anthraquinone and cathode decolorized conductive polymer; and further comprises one or more of p-type metal oxide, compound based on aniline, compound based on amino quinones, organic compound based on rare earth elements, compound based on dibenzo-p-dioxins, compound based on dye and anode decolorized conductive polymer.

5. The color filter substrate according to claim 1, wherein the red filters, the green filters and the blue filters are manufactured by pigment dispersion, dye or ink injection.

6. The color filter substrate according to claim 1, wherein the first transparent electrode, the color change filter and the second transparent electrode are sequentially stacked on the substrate.

7. A color filter substrate, comprises a substrate, a color filter layer positioned on the substrate and a protective layer positioned on the color filter layer;
the color filter layer comprises a plurality of red filters, green filters, blue filters and color change filters aligned in matrix and aligned in a same plane, and a first transparent electrode and a second transparent electrode are respectively positioned at two sides of the color change filter; a black matrix separates the plurality of red filters, the green filters, the blue filters and the color change filters aligned in matrix and aligned in the same plane;
material of the color change filter is electrochromic material, and the color change filter is applied with voltage signals via the first transparent electrode and the second transparent electrode to control color change of the color change filter;
wherein before the color change filter is applied with the voltage signals via the first transparent electrode and the second transparent electrode, the color change filter appears to be transparent to achieve high brightness; after the color change filter is applied with the voltage signals via the first transparent electrode and the second transparent electrode, the color change filter appears to be a specific color which is not red, green, blue and black to promote color expression ability for achieving high color saturation;
or before the color change filter is applied with the voltage signals via the first transparent electrode and the second transparent electrode, the color change filter appears to be a specific color which is not red, green, blue and black to promote color expression ability for achieving high color saturation; after the color change filter is applied with the voltage signals via the first transparent electrode and the second transparent electrode, the color change filter appears to be transparent to achieve high brightness;

wherein the protective layer positioned on the color filter layer prevents an interference of the first transparent electrode and the second transparent electrode to pixel electrodes and a common electrode of a liquid crystal display panel as the color filter layer is applied to the liquid crystal display panel;

wherein the electrochromic material comprises one or more of n-type metal oxide, compound based on viologen group, compound based on phthalate, compound based on pyridine, compound based on anthraquinone and cathode decolorized conductive polymer; and further comprises one or more of p-type metal oxide, compound based on aniline, compound based on amino quinones, organic compound based on rare earth elements, compound based on dibenzo-p-dioxins, compound based on dye and anode decolorized conductive polymer;

wherein the red filters, the green filters and the blue filters are manufactured by pigment dispersion, dye or ink injection.

8. The color filter substrate according to claim 1, wherein the chromaticity coordinates of the specific color comprises x(0.01~0.265), y(0.01~0.710).

9. The color filter substrate according to claim 8, wherein the specific color is cyan.

10. The color filter substrate according to claim 7, wherein the first transparent electrode, the color change filter and the second transparent electrode are sequentially stacked on the substrate.

11. A liquid crystal display panel, comprising an opposite substrate and an array substrate which are oppositely positioned, and a liquid crystal layer filled between the opposite substrate and the array substrate;
the opposite substrate or the array substrate further comprises a color filter layer and a protective layer positioned on the color filter layer; the color filter layer comprises a plurality of red filters, green filters, blue filters and color change filters aligned in matrix and aligned in a same plane, and a first transparent electrode and a second transparent electrode are respectively positioned at two sides of the color change filter; a black matrix separates the plurality of red filters, the green filters, the blue filters and the color change filters aligned in matrix and aligned in the same plane;
material of the color change filter is electrochromic material, and the color change filter is applied with voltage signals via the first transparent electrode and the second transparent electrode to control color change of the color change filter; wherein before the color change filter is applied with the voltage signals via the first transparent electrode and the second transparent electrode, the color change filter appears to be transparent to achieve high brightness; after the color change filter is applied with the voltage signals via the first transparent electrode and the second transparent electrode, the color change filter appears to be a specific color which is not red, green, blue and black to promote color expression ability for achieving high color saturation;
or before the color change filter is applied with the voltage signals via the first transparent electrode and the second transparent electrode, the color change filter appears to be a specific color which is not red, green, blue and black to promote color expression ability for achieving high color saturation; after the color change filter is applied with the voltage signals via the first transparent electrode and the second transparent electrode, the color change filter appears to be transparent to achieve high brightness for making the liquid crystal display panel conveniently achieve an easy switch of a high brightness display mode and a high color saturation mode; wherein the protective layer positioned on the color filter layer prevents an interference of the first transparent electrode and the second transparent electrode to pixel electrodes and a common electrode of the liquid crystal display panel as the color filter layer is applied to the liquid crystal display panel.

12. The liquid crystal display panel according to claim 11, wherein the chromaticity coordinates of the specific color comprises x(0.01~0.265), y(0.01~0.710).

13. The liquid crystal display panel according to claim 12, wherein the specific color is cyan.

14. The liquid crystal display panel according to claim 11, wherein the electrochromic material comprises one or more of n-type metal oxide, compound based on viologen group, compound based on phthalate, compound based on pyridine, compound based on anthraquinone and cathode decolorized conductive polymer; and further comprises one or more of p-type metal oxide, compound based on aniline, compound based on amino quinones, organic compound based on rare earth elements, compound based on dibenzo-p-dioxins, compound based on dye and anode decolorized conductive polymer;

the red filters, the green filters and the blue filters are manufactured by pigment dispersion, dye or ink injection.

15. The liquid crystal display panel according to claim 11, wherein the color filter layer is positioned on the opposite substrate, and the first transparent electrode, the color change filter and the second transparent electrode are sequentially stacked on the opposite substrate; the array substrate further comprises a plurality of thin film transistors aligned in matrix and the pixel electrodes electrically coupled to the thin film transistors.

16. The liquid crystal display panel according to claim 11, wherein the color filter layer is positioned on the array substrate, and the array substrate further comprises a plurality of thin film transistors aligned in matrix and pixel electrodes electrically coupled to the thin film transistors; the first transparent electrode, the color change filter and the second transparent electrode are sequentially stacked; the common electrode is positioned on the opposite substrate.

* * * * *